United States Patent [19]
Meijer

[11] Patent Number: 6,036,323
[45] Date of Patent: Mar. 14, 2000

[54] SOLAR INSOLATION CONCENTRATOR, FABRICATION TOOL AND FABRICATION PROCESS

[75] Inventor: Roelf J. Meijer, Saline, Mich.

[73] Assignee: Products Innovation Center, Inc., Saline, Mich.

[21] Appl. No.: 08/769,147

[22] Filed: Dec. 18, 1996

[51] Int. Cl.[7] .............................. G02B 5/08; A01J 21/00; B29D 11/00; F24J 2/16

[52] U.S. Cl. .......................... 359/851; 359/896; 425/385; 425/394; 264/1.9; 126/685; 126/696

[58] Field of Search ..................... 359/850, 851, 359/853, 855, 871, 872, 873, 876, 896; 425/385, 394; 126/684, 685, 687, 688, 689, 690, 691, 696; 264/1.1, 1.9

[56] References Cited

U.S. PATENT DOCUMENTS

| | | | |
|---|---|---|---|
| 514,669 | 2/1894 | Allingham | 359/876 |
| 3,152,260 | 10/1964 | Cummings . | |
| 3,358,332 | 12/1967 | Downey | 425/394 |
| 3,900,279 | 8/1975 | Newby | 425/385 |
| 3,977,773 | 8/1976 | Hubbard . | |
| 4,010,614 | 3/1977 | Arthur . | |
| 4,195,913 | 4/1980 | Dourte et al. . | |
| 4,209,231 | 6/1980 | Sayre | 359/876 |
| 4,245,895 | 1/1981 | Wildenrotter . | |
| 4,253,895 | 3/1981 | Chenault . | |
| 4,256,088 | 3/1981 | Vindum . | |
| 4,266,530 | 5/1981 | Steadman | 359/851 |
| 4,395,581 | 7/1983 | Girard . | |
| 4,465,734 | 8/1984 | Laroche et al. . | |
| 4,557,569 | 12/1985 | Hacskaylo . | |
| 4,682,865 | 7/1987 | Rogers et al. . | |
| 4,696,554 | 9/1987 | Seawright . | |
| 4,784,700 | 11/1988 | Stern et al. . | |
| 4,919,527 | 4/1990 | Saiylov et al. . | |
| 5,272,570 | 12/1993 | Yoshida et al. . | |
| 5,347,402 | 9/1994 | Arbogast . | |

*Primary Examiner*—Ricky D. Shafer
*Attorney, Agent, or Firm*—Harness, Dickey & Pierce LLC

[57] ABSTRACT

A solar insolation concentrator fabricated from a rigid lightweight (slab-like substrate and a plurality of reflectors. Inclined surfaces are formed in the face surface of the substrate, such as by impressing a heated plate portion of a fabrication tool into the substrate material. The fabrication tool is then used to position the reflectors as they are adhered to the inclined surfaces to assure that the reflectors are aligned with respect to a common focal point. An embodiment of the solar insolation concentrator comprising a plurality of identical square flat back-silvered glass mirrors mounted within recesses within a block of high density cellular polystyrene and a tool and process used to fabricate this concentrator are disclosed. The solar insolation concentrator is also suited for use as a reflector of electromagnetic radiation having wavelengths outside the solar energy spectrum.

11 Claims, 5 Drawing Sheets

Note: Steps 96 & 100 may be combined into a single step

SOLAR INSOLATION CONCENTRATOR, FABRICATION TOOL AND FABRICATION PROCESS

BACKGROUND AND SUMMARY OF THE INVENTION

This invention is related to solar insolation concentrators and particularly to a solar insolation concentrator formed from an assembly of flat reflector facets positioned within a slab-like substrate and a tool and process for fabricating this type of solar insolation concentrator.

The vast majority of solar insolation concentrators that have been developed have generally parabolic shapes or have pieces with partially parabolic shapes. A parabolic shape is mathematically desirable because when incoming solar energy is parallel to the central axis of a parabolic concentrator, the energy reflected off the surface of the concentrator is redirected toward a single focal point, where the maximum concentration of solar energy takes place. Because solar energy received from the sun is not uniformly parallel (because the sun is not a true point light source), the maximum energy flux of the concentrated solar energy will be found in a disk or torus shaped solar image centered about the focal point for the concentrator. This concentrated solar energy can then be absorbed by a solar receiver having a sufficient opening for the solar image and utilized, such as by a Stirling cycle engine.

Reflectors, such as those found in reflecting telescopes, have been developed that have extremely precise optical characteristics and very high reflectivity. Significant difficulties have been encountered when attempting to use the types of manufacturing techniques used to manufacture these types of reflectors to manufacture parabolic concentrators with the large dimensions needed to collect commercial quantities of solar energy.

Laboratory reflectors are typically manufactured from a single piece of substrate, often glass or metal, which is shaped precisely to the required configuration. The use of a single piece reflector is obviously impractical if the desired solar insolation concentrator has a very large diameter, such as 10 meters or 15 meters, as is commonly found in solar energy collection systems. A parabolic structure this large generally requires an assembly of components, such as steel tubing or steel truss members, which are fabricated into a parabolic-shaped framework. While the fabrication of this type of a parabolic framework is simple in concept, in practice it is very labor intensive and involves substantial manufacturing costs. In addition, it is virtually impossible to manufacture the parabolic framework with sufficient precision to allow the reflectors to be simply mounted and aligned with respect to the framework without additional individual adjustment and tuning of the reflectors to obtain a common focal point and acceptable concentration efficiencies.

Selecting the appropriate reflective material and method for mounting the reflectors to this framework is also problematic. A single-piece glass mirror with a diameter of 10 meters would obviously be prohibitively expensive to manufacture. The most efficient large solar concentrators in use today utilize arrays of curved glass mirror panels, with each panel being approximately 20 inches by 20 inches. To obtain a common focal point for the assembly of panels in the concentrator, each mirror has to be individually adjusted and shaped.

Concentrators utilizing single polished metal membrane mirrors have also been developed. In these concentrators, a single sheet of membrane material is stretched over a circular frame and a vacuum developed on the back of the membrane which draws the material into a parabolic shape. The reflection efficiency of this membrane material, however, is substantially less than the reflection efficiency of glass mirrors. It is also difficult to stretch the membrane into the precise parabolic shape required and difficult to keep the membrane fixed in this position for long periods of time.

Another approach is to divide the parabolic reflector surface area into a number of cells (for instance 12 or 16) and then use identical partially parabolic reflector facets for each of the cells. To obtain a common focal point, each reflector facet has to be individually adjusted after it has been attached to the framework. Because the shapes of these reflector facets are not individually customized to take into account their actual placement location within the parabolic reflector surface, the reflector facets do not have ideal optical characteristics when they are mounted in this sort of cellular array.

Plastic mirrors have been used, but these mirrors are significantly more easily damaged by exposure to the elements than glass mirrors and tend to rapidly lose their reflection efficiency.

An object of the present invention is to manufacture a solar insolation concentrator that does not require a parabolic framework to support individual reflectors and which incorporates a slab-like rigid substrate that fixes and maintains the reflectors in positions which have a common focal point.

A further object of the present invention is to manufacture a solar insolation concentrator which utilizes readily available, durable, efficient and relatively low cost flat back-silvered glass mirrors as reflector elements.

Another object of the present invention is to simplify and automate the process of fixing individual reflectors to a support structure and properly aligning the reflectors with respect to a designed focal point during the fabrication of solar insolation concentrators.

Still another object of the present invention is to reduce both the variable and fixed costs of manufacturing high efficiency solar insolation concentrators, including the costs of the materials, the labor required, and the tooling needed to fabricate the concentrators.

The inventive solar insolation concentrator is fabricated by fixing a multitude of flat solar reflectors to a rigid lightweight slab-like substrate that has inclined surfaces in its face surface that allow the reflectors to be aligned with a common focal point. The solar reflectors typically comprise small pieces of flat back-silvered glass mirrors having relatively thin glass. The pieces of glass mirror are preferably identically sized and may, for example, be two inches by two inches square. The substrate typically comprises a block of rigid lightweight strong material, such as a foamed plastic. High density cellular polystyrene (such as material sold under the "Styrofoam" trademark) has proven to be an acceptable substrate material for the inventive solar insolation concentrator.

The solar insolation concentrator is fabricated by first forming inclined surfaces in the substrate, typically by impressing a hot plate into the substrate material. Efficiently and accurately orienting this plate as it forms the impression in the substrate and then orienting a reflector as it is being fixed to the impression has proven to be a surprisingly difficult manufacturing problem. A typical engineering approach would be to mathematically calculate the proper inclination angle for each individual reflector position in the array and then to painstakingly position each reflector at its designated position and inclination angle using measuring devices such as rulers and levels. This type of labor intensive/brute force approach, while often acceptable for producing prototypes or research models, is not a cost effective method for mass producing a commercial product. It is extremely tedious and difficult to precisely form inclined surfaces in and adhere reflectors to a substrate that may require hundreds or thousands of such inclined surfaces and reflectors. Another commonly used approach would be to develop tooling, such as jigs, based on these mathematical calculations, that allow individual reflectors (or reflectors in symmetrically placed positions within the concentrator array) to be accurately positioned in the substrate in a repeatable manner. While better at cost effectively producing a commercial product than the first approach, this approach requires a substantial amount of tooling (i.e. individual tools are required for each individual reflector or individual symmetrically placed reflector group) and the tooling would only be useable to manufacture a single concentrator design. Another method would be to use robotic equipment programmed with the desired inclined surface coordinates. Robotic equipment having the required range of movement and degree of precision is both extremely expensive to purchase and relatively difficult to operate.

Applicant has developed an elegant solution to this problem which consists of a relatively simple tool that allows inclined surfaces to be made into the substrate which are precisely positioned and which assures that the reflectors adhered to the substrate have a common focal point. This fabrication tool is easily adjustable and can be used to develop a wide varieties of concentrator designs. The fabrication tool offers a degree of precision and repeatability in reflector placement that would be difficult to achieve by any other method.

The fabrication tool uses a pole, attached to a pivot that is fixed with respect to the substrate, and lower and upper pairs of guide rods, which are pivotally and slidingly connected to the pole. The lower guide rods are constrained by a guide fixed to the pole, through which the lower pair of guide rods are able to slide and also able to swivel about the fixed focal point. The upper guide rods are constrained by a sliding swivel located on the pole above the focal point through which the upper pair of guide rods are also able to slide. The sliding swivel is connected by a cable which passes over a pulley at the top of the pole and is connected to a weight that can slide within the pole. This weight constantly urges the sliding swivel toward the top of the pole. Ends of both pairs of guide rods are joined to components of the positioning head assembly. The guide rods are restrained by a thin cable connected to the end of the lower guide rods and the sliding swivel, which synchronizes the motion of the guide rods and assures that a reflector centered within the press plate of the positioning head assembly will share a common focal point with any other reflector similarly positioned on the substrate by the fabrication tool. The positioning head assembly also has a heating element that heats a press plate that is able to form inclined surfaces in the substrate into which the reflectors are placed.

The typical process for fabricating the inventive solar insolation concentrator using the fabrication tool is relatively simple. The substrate is first fixed with respect to the fabrication tool, such as by placing the substrate over the pivot and attaching the pole. If necessary, the fabrication tool is then adjusted to provide the desired focal length. If the fabrication tool is used to repetitively manufacture a single type of solar insolation concentrator, this adjustment step is not required after the first concentrator is manufactured. An inclined surface is then formed in the substrate by the positioning head assembly of the fabrication tool. An adhesive is then applied to the inclined surface and the back surface of a reflector is placed into contact with this adhesive. The reflector is then precisely positioned with respect to the desired focal point using the fabrication tool. This process is repeated until the face surface of the substrate is covered by reflectors (other than where the pivot and pole are located, if the pivot and pole are positioned within the substrate). The operator then takes any actions necessary to complete the concentrator, such as adding structural supports which increase the rigidity of the substrate.

It is also possible to spray the entire substrate surface with a thermoplastic adhesive (either before or after the inclined surfaces have been formed) and to attach the reflectors to the substrate by heating the reflectors before they are placed into contact with the adhesive. For certain types of substrate and reflector materials it may be possible to eliminate the adhesive altogether and to attach the reflectors to the substrate merely by warming the reflectors and pressing them against the substrate.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
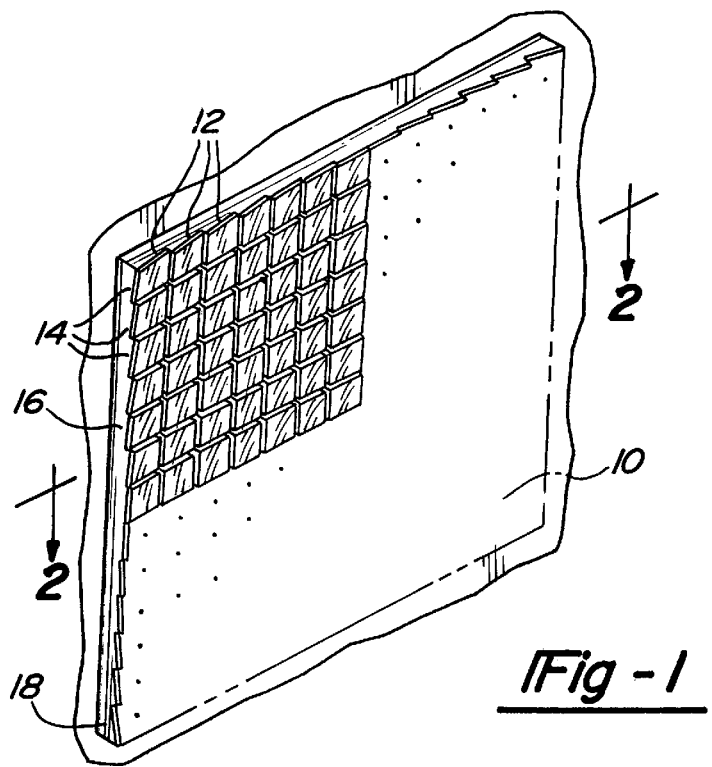
FIG. 1 is a perspective view of a solar insolation concentrator in accordance with this invention.

A solar insolation concentrator in accordance with this invention is shown in a completely fabricated condition in FIG. 1 and is generally designated by reference number 10. Solar insolation concentrator 10 includes a plurality of reflectors 12 fixed to inclined surfaces 14 in the face surface of substrate 16 A shell 18 is fixed to the back surface and a portion of the sides of substrate 16 to increase the rigidity of substrate 16 and to protect the substrate from damage.

Solar insolation concentrators have two primary measures of operating efficiency. Reflection efficiency is calculated by comparing the quantity of solar energy reflected by the concentrator to the quantity of solar energy received by the concentrator. The maximum reflection efficiency of a concentrator will depend almost entirely on the reflective material used to fabricate the concentrator and the proportion of the surface area of the concentrator covered by the reflective material. Reflection efficiency will be reduced by dust or debris on the surface of the reflector and damage to or degradation of the reflector material. Concentration efficiency is measured by determining how precisely the reflected solar energy is concentrated at the desired focal point area. If the solar energy is not sufficiently concentrated, a larger solar energy receiver will be required, which will substantially reduce the overall efficiency of the solar energy collection system. When the receiver is a heater assembly for a Stirling engine or other heat engine, for instance, less precisely concentrated solar energy will force the solar energy receiver opening to be larger (increasing energy losses through the opening) and the receiver tubes to be longer (increasing energy losses associated with friction caused by working fluid flow within the tubes) than would otherwise be necessary. A concentrator which focuses the reflected solar energy tightly and uniformly around the focal point is desired. "Hot spots" or areas of inadvertently highly concentrated solar energy away from the focal point are undesirable because they can cause solar energy receiver component failures.

Reflectors 12 can be fabricated from any type of material that has a high reflection efficiency (i.e. a high specular reflectivity with respect to the type of electromagnetic radiation being reflected, such as solar energy). The vast majority of solar energy received on the earth's surface is from solar radiation having wavelengths between 0.2 and 2.0 micrometers and reflectors 12 must be highly specularly reflective of electromagnetic radiation within these wavelengths when solar insolation concentrator 10 is used for solar energy collection purposes. The materials with the highest reflection efficiency with respect to solar energy in common use are back-silvered glass mirrors having relatively thin glass. Other materials which could be used for reflectors 12 in solar energy collection applications include polished metals, plastic mirrors and substrates upon which a reflective layer, typically a metallic layer, has been deposited. A lightweight material retaining a high reflection efficiency even after long term outdoor exposure to agents such as ultraviolet radiation, rain, windblown debris, and ozone is ideal. Thin, back-silvered, glass mirrors are the preferred material for reflectors 12. Reflectors 12 have a face surface, also called the front surface, that is oriented toward the solar energy, and a back surface that is oriented away from the solar energy.

Reflectors 12 can be fabricated in a wide variety of shapes and sizes. It is desirable that reflectors 12 nest tightly together to increase the reflective surface area of solar insolation concentrator 10. The fabrication process can be greatly simplified by using reflectors 12 that have a single size and shape. Shapes that allow identically sized reflectors 12 to be tight nested together include squares, rectangles, triangles and hexagons. Due in part to the relatively low cost of obtaining mirrors in this shape and size, reflectors 12 that are flat glass mirrors two inches by two inches square are preferred for many small solar insolation concentrator applications. In large solar insolation concentrator arrays, the size of these mirrors may be increased because the size of the solar image is bigger and the portion of the image attributable to each of the individual reflectors is proportionately smaller. While the concentration efficiency of the concentrator could be increased through the use of reflectors 12 that have slightly concave reflective surface curvatures, the optimal degree of curvature for each reflector would vary based on the position of the reflector in the concentrator array, and the additional cost of these types of reflectors and the increased manufacturing complexity associated with the utilization of reflectors which have a multitude of different shapes virtually always outweighs the modest performance benefits that could be obtained. The performance improvements available through the use of curved mirrors is particularly insignificant if the size of individual reflectors 12 is relatively small.

Substrate 16 is the support structure for the solar insolation concentrator and comprises a slab-like block of rigid light strong material, such as a foamed plastic. Reflectors 12 are substantially recessed within the body of substrate 16 and are fixed to inclined surfaces 14, also referred to as reflector attachment sites, within the substrate by an adhesive. Inclined surfaces 14 can be thought of as impressions, depressions, troughs or recessed regions within substrate 16 which allow reflectors 12 to be mounted to the substrate at the proper inclination angle. Inclined surfaces 14 are typically formed through the formation of impressions into the substrate 16 body by the fabrication tool, as discussed in detail below. When these impressions are formed, the recessed areas will have openings along the original relatively flat surface of substrate 16 and inclined surfaces 14 that reflectors 12 will be attached to will be along the sides of these recessed areas. If inclined surfaces 14 are to be formed by the fabrication tool, it is important that the substrate material be formable by the positioning head assembly of the fabrication tool. Inclined surfaces 14 are typically formed by pressing a heated plate into substrate 16, thereby both crushing and melting the substrate material. Other methods for forming inclined surfaces 14 in substrate 16, such as crushing, cutting, abrading or grinding, are also possible. Blocks of high density cellular polystyrene (such as material sold under the "Styrofoam" trademark) has proven to be an acceptable material for substrate 16.

It is important that the substrate 16 be relatively rigid, so that reflectors 12 are retained in proper alignment with respect to the designed focal point of concentrator 10. Structural elements, such as lightweight aluminum shell 18, may be fixed to the back and/or sides of substrate 16 to increase the rigidity of concentrator 10 and to protect it from damage. A wide variety of alternative structural element for increasing the rigidity of concentrator 10 and protecting it from damage could be used.

FIG. 1 is perspective view of concentrator 10 that shows the closely nested relationship of reflectors 12. Reflectors 12 are mounted within substrate 16 and the back surfaces of reflectors 12 have been adhered to inclined surfaces 14 of the face surface of substrate 16. Shell 18, manufactured from a thin aluminum sheet, is attached to substrate 16 and covers the back and a portion of the sides of substrate 16. The center of each reflector 12 in concentrator 10 has been aligned with a common focal point, as will be discussed in detail below.

Figure 2:
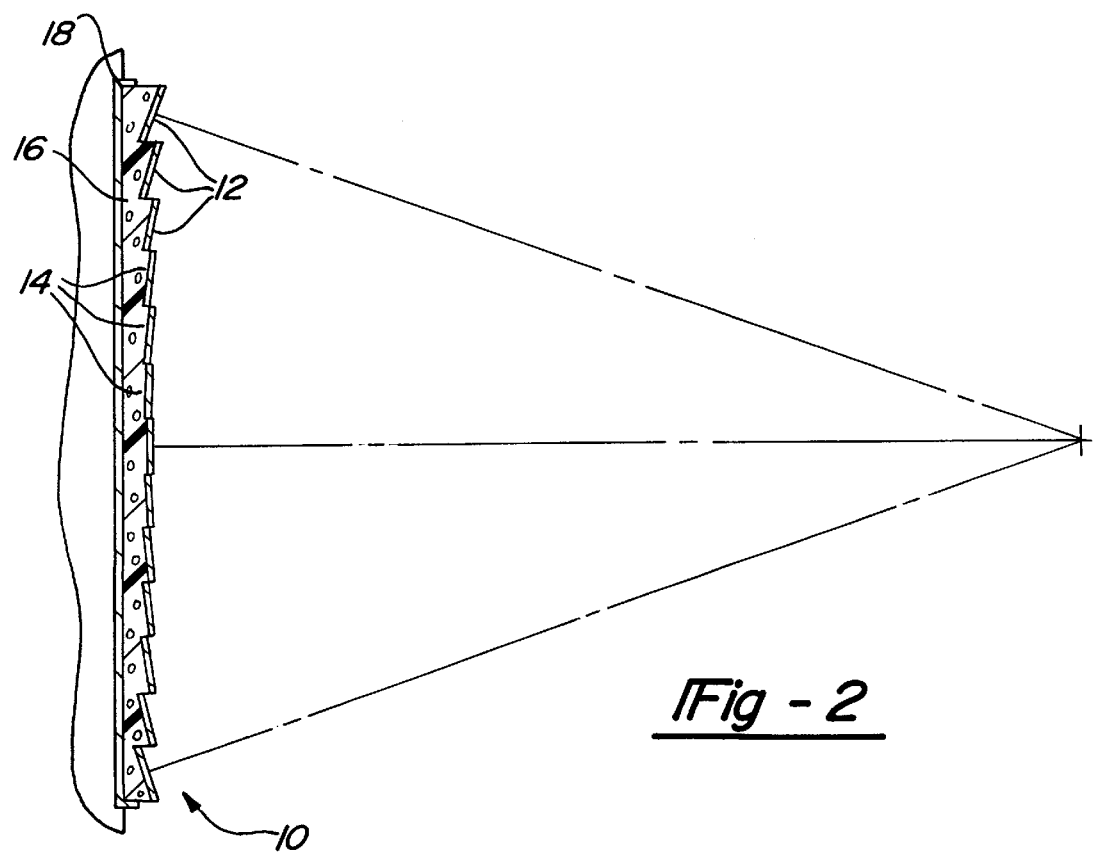
FIG. 2 is a cross sectional view taken along line 2—2 from FIG. 1.

FIG. 2 is a cross sectional view of concentrator 10 that shows the center reflector 12 being horizontally mounted, with each reflector located further away from this center reflector being mounted at a steeper inclination angle toward the center. This type of relationship is required to produce a concentrator 10 having a common focal point.

The inventive process for fabricating a slab-like solar insolation concentrator 10 having an array of flat reflector 12 elements with a common focal point is equivalent to segmenting a flat surface into an array of cells, identifying parabolic surfaces which have common focal points (and different focal lengths) which pass through the center point of each cell and then orienting a flat reflector 12 within each cell tangentially to the particular parabolic surface which passes through the center point of the cell. Reflectors 12 have precisely correct focal points only in the center of the reflector and only for light received directly from the center of the sun, because they are flat instead of curved, but the deviation associated with the lack of curvature in the reflector is relatively small due to the relatively small size of each of the reflectors compared to the total reflective surface area of the concentrator.

Figure 3:
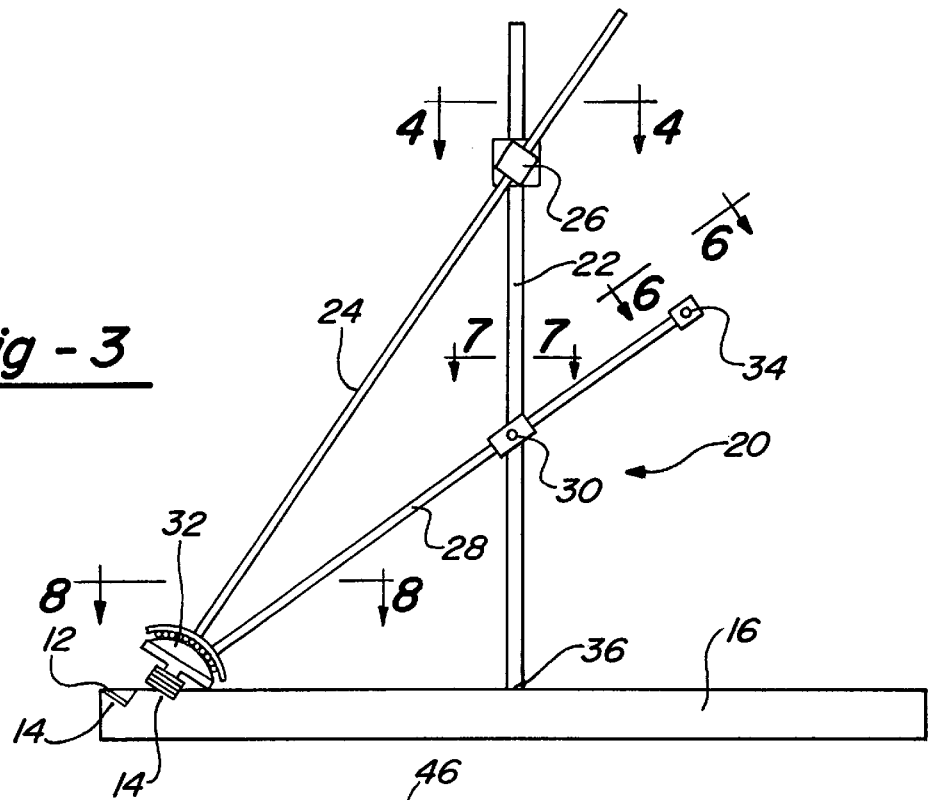
FIG. 3 is a side view of the solar insolation concentrator fabrication tool.

FIG. 3 shows fabrication tool 20 in the process of fabricating solar insolation concentrator 10. Fabrication tool 20 comprises pole 22, a pair of upper guide rods 24 (only one of which is shown in FIG. 3), sliding swivel 26, a pair of lower guide rods 28 (only one of which is shown in FIG. 3), pivoting guide 30, positioning head assembly 32, cable adjustment device 34, pivot 36, as well as other components which will be described in detail below.

During fabrication of concentrator 10, pole 22 is allowed to pivot with respect to substrate 16 about pivot 36 which remains fixed with respect to substrate 16 while inclined surfaces 14 are being made and while reflectors 12 are being positioned. Pivot 36 acts as a support for the remaining components of fabrication tool 20. Upper guide rods 24 are attached to pole 22 by sliding swivel 26 and are fixed to components of positioning head assembly 32. Lower guide rods 28 are attached to pole 22 by pivoting guide 30 and are also fixed to components of positioning head assembly 32. A detailed description of the individual components of fabrication tool 20 follows.

Figure 4:
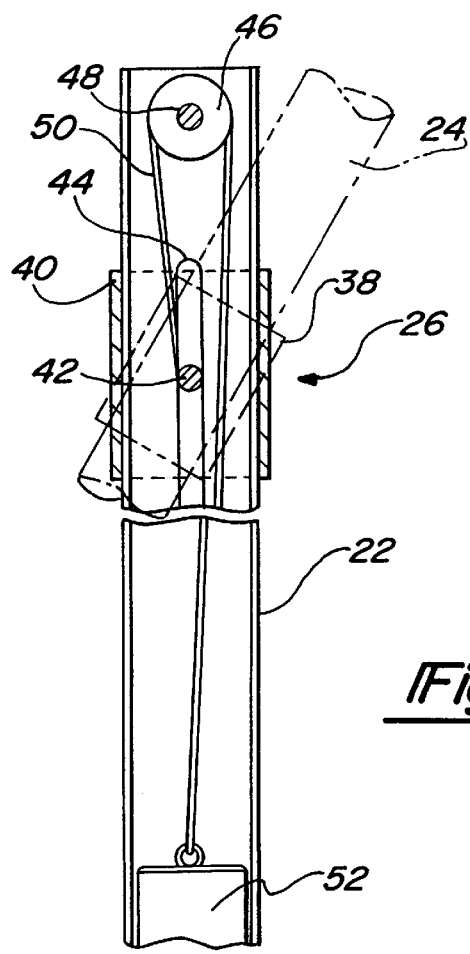
FIG. 4 is an enlarged cross sectional view taken along line 4—4 in FIG. 3.

FIG. 4 is a cross sectional view which shows the components of sliding swivel 26 and certain other components of fabrication tool 20. Sliding swivel assembly 26 comprises outer sleeves 38 (only one of which is shown, in phantom), inner sleeve 40 and pin 42. Upper guide rods 24 are guided by but are able to freely slide within outer sleeves 38. Outer sleeves 38 are joined to inner sleeve 40 by pin 42 and can rotate with respect to inner sleeve 40 about pin 42. Pin 42 is restrained within slot 44 of pole 22 and can only move up or down with respect to pole 22 within slot 44. Pulley 46, located within pole 22, is connected to pole 22 by pulley pin 48 and is able to freely rotate about this pulley pin. Cable 50 is attached at one end to pin 42. Cable 50 passes over pulley 46 and is attached at the other end to weight 52, which is able to slide within pole 22. The gravitational force exerted weight 52 constantly urges pin 42 and the other components of sliding swivel 26 upward toward pulley 46.

Figure 5:
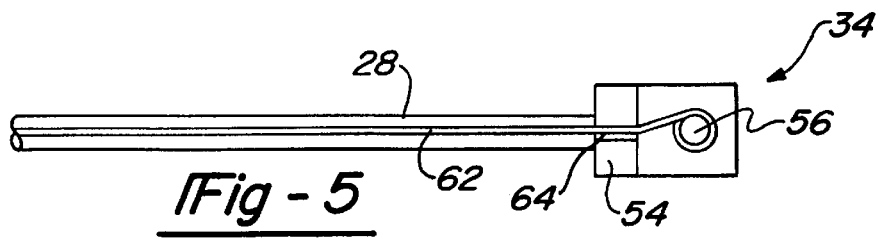
FIG. 5 is an enlarged side view of the cable adjustment device component of the solar ins concentrator fabrication tool.
Figure 6:
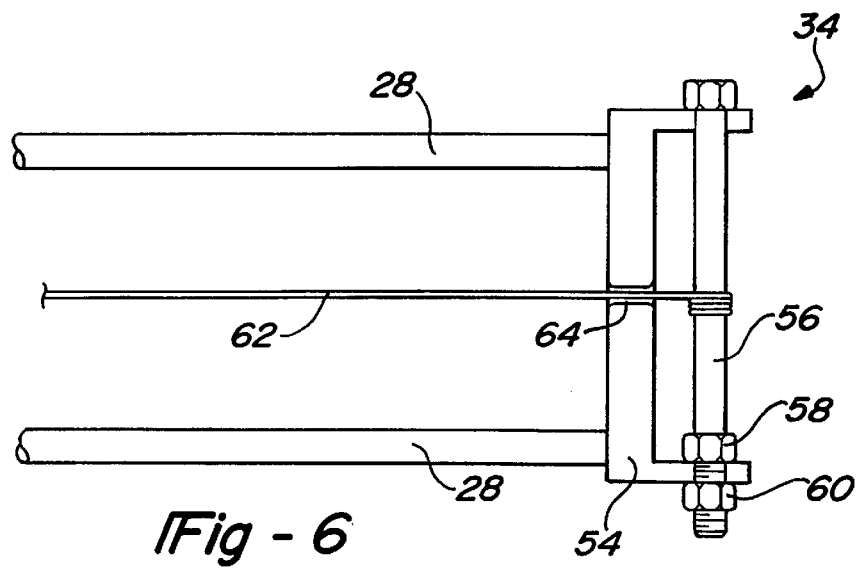
FIG. 6 is an enlarged plan view taken along line 6—6 in FIG. 3.

FIGS. 5 and 6 show respectively, a side view and a plan view of cable adjustment device 34. Cable adjustment device 34 comprises bracket 54, tensioning bolt 56, inner nut 58 and outer nut 60. Bracket 54 is fixed to ends of lower guide rods 28. Thin cable 62 passes through cable opening 64 in bracket 54 and is fixed to and wrapped around tensioning bolt 56. The purpose of cable adjustment device 34 is to allow the free length of thin cable 62 to be adjusted. The free length of thin cable 62 can be adjusted by loosening inner nut 58 and outer nut 60, rotating tensioning bolt 56 either clockwise or counterclockwise, and then tightening inner nut 58 and outer nut 60.

Figure 7:
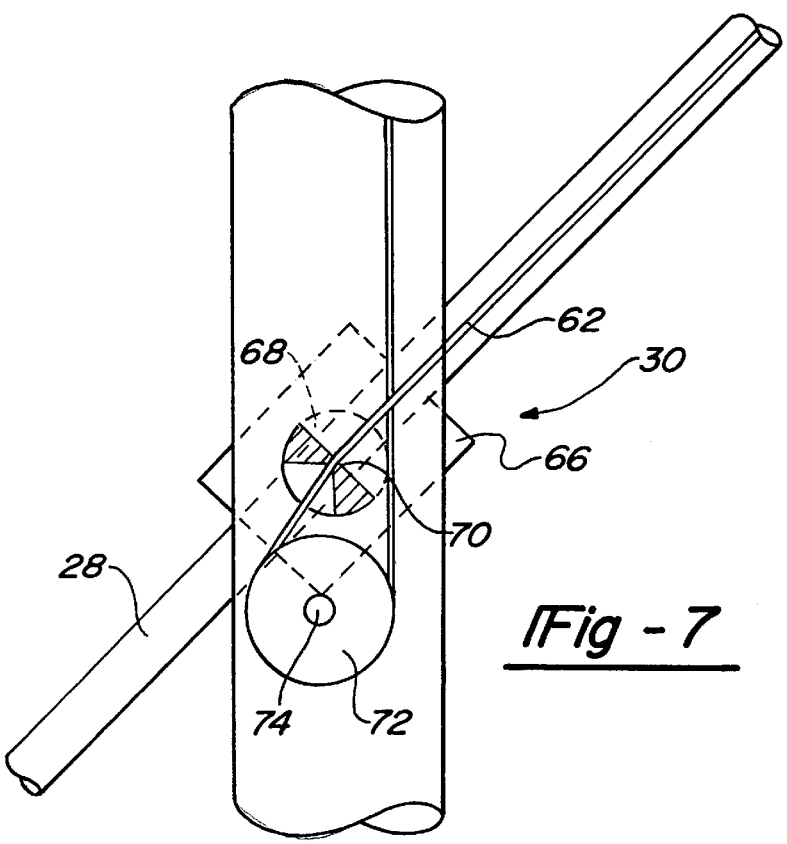
FIG. 7 is an enlarged cross sectional view taken along line 7—7 in FIG. 3.

FIG. 7 is a cross sectional view of pivoting guide 30 and associated components of fabrication tool 20. Lower guide rods 28 are guided by but able to freely slide through lower sleeves 66. Only one lower sleeve 66 is shown in FIG. 7, and it is shown in phantom. Lower sleeves 66 are connected by swivel point shaft 68 which rests in a pair of circular openings in pole 22 and is able to rotate with respect to pole 22. In the center of swivel point shaft 68 is cable opening 70. Thin cable pulley 72 is connected to pole 22 by thin cable pulley shaft 74 and is able to freely rotate about this thin cable pulley shaft. Thin cable 62 which has one end fixed to tensioning bolt 56, passes through cable opening 70, wraps around thin cable pulley 72 and is connected to pin 42 in sliding swivel assembly 26. When a solar insolation concentrator 10 is fabricated using fabrication tool 20 as described herein, the focal point for the concentrator will be the point that is precisely in the center of swivel point shaft 68.

Thin cable 62 assures that the distance between the end of lower guide rods 28 and the designed focal point plus the distance between the designed focal point and the center of pin 42 remains constant. To place reflectors 12 with the proper inclination angle (i.e. with the proper focal point), thin cable 62 must be adjusted so that the distance between the designed focal point and the center of pin 42 is equal to the distance between the designed focal point and the central positioning point of positioning head assembly 32, as will be explained in detail below. When configured in this way, an isosceles triangle is formed, with the third side of the triangle being formed between the center of pin 42 and the central positioning point of positioning head assembly 32. If a reflector is located at the central positioning point of positioning head assembly 32 and is positioned perpendicular to this third side of the isosceles triangle, an incoming light beam parallel to pole 22 striking the reflector in the central positioning point will be reflected precisely through the designed focal point.

Figure 8:
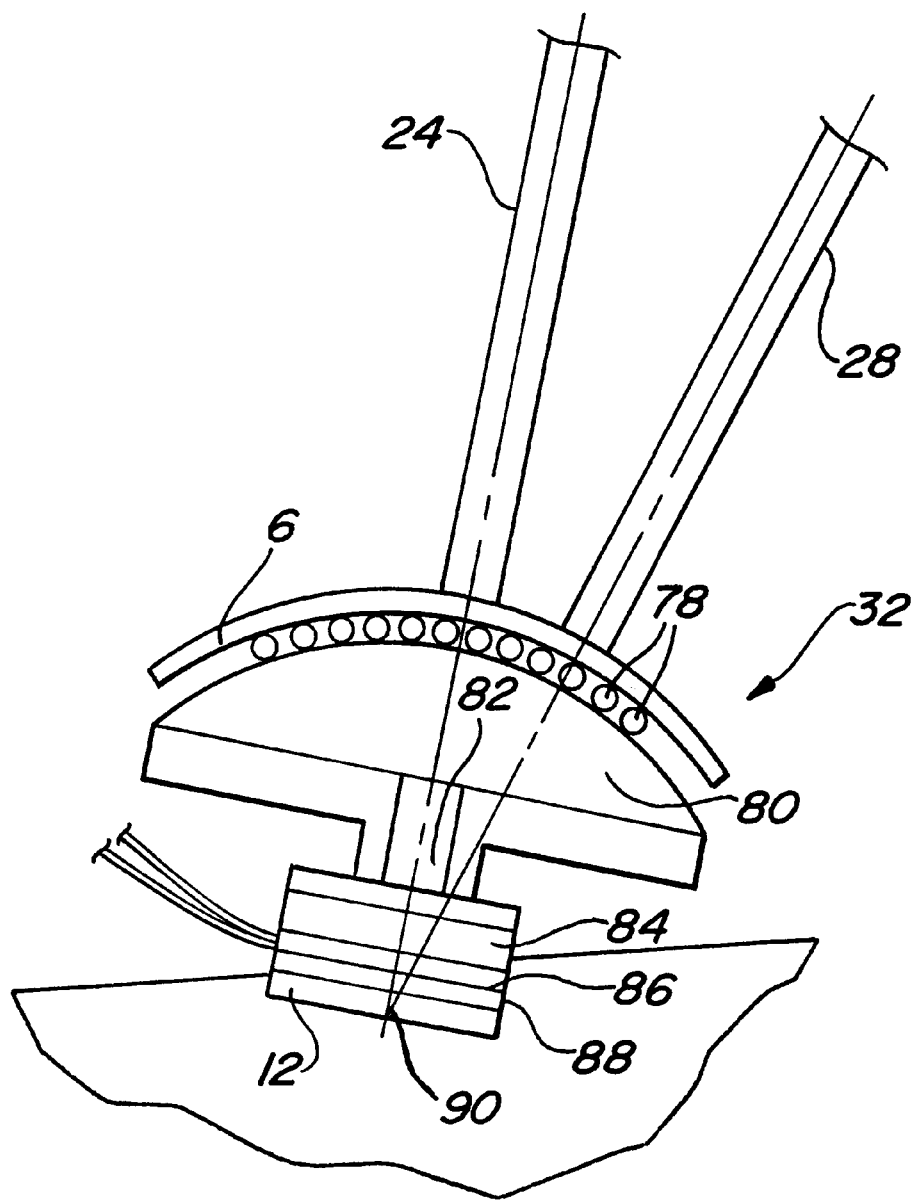
FIG. 8 is an enlarged cross sectional view taken along line 8—8 in FIG. 3.

Referring now to FIG. 8, positioning head assembly 32 includes the following components: housing 6, bearings 78, body 80, swivel 82, insulation 84, heating element 86 and plate 88. Housing 6 is fixed to lower guide rods 28. Body 80 is fixed to upper guide rods 24. Housing 6 and body 80 are joined by and can rotate with respect to each other through the use of bent linear needle bearings 78. Springs (not shown) bias housing 6 toward body 80 and help to retain needle bearings 78 between housing 76 and body 80. Body 80 is fixed to swivel 82 which is, in turn, fixed to insulation 84, heating element 86 and plate 88. Swivel 82 allows the assembly comprising insulation 84, heating element 86 and plate 88 to be rotated with respect to body 80. Electric heating element 86 is used to warm aluminum plate 88. Insulation 84 inhibits heat from heating element 86 from being conducted back into the remaining components of positioning head assembly 32 through swivel 82.

The geometries of the components positioning head assembly 32 are crucial. The designed central positioning point of positioning head assembly 32 is a point in the center of the reflecting surface of reflector 12 after the reflector has been positioned by fabrication tool 20. Due to the refractive index between air and glass, the "apparent" reflection point of any incident light ray on a glass mirror will be some distance above the interface between the glass and the silvering material unless the incident light ray is precisely normal to the mirror. To correct for this phenomenon, Applicant has determined that an appropriate average "apparent" reflection point for the subject solar concentrator is the point 60% of the way through the glass when measured from the front surface of the mirror toward the glass/silvering material interface. For a flat square back-silvered glass mirror, therefore, the designed central positioning point will be a point in the center of the mirror after the front surface of the mirror has been firmly placed into contact with plate 88 approximately 60% of the way through the glass when measured from the front surface of the mirror toward the silvering material on the back of the mirror. In FIG. 8, this point is designated as central positioning point 90. If reflector 12 was made from polished metal, the designed central positioning point would be located on the front surface of the reflector. For flat reflectors, the center point can be determined by finding the "center of surface area" of the reflecting surface of the reflector, because the solar energy reflected by the reflector will be distributed about the designed focal point when the reflector has been aligned with respect to this center point.

If inclined surfaces 14 are formed first and reflectors 12 are adhered to the inclined surfaces in a separate step, an additional aluminum plate can be attached to aluminum plate 88 to produce a inclined surface having an optimal depth. This additional aluminum plate will have dimensions identical to reflectors 12. Because thin glass mirrors may only be one millimeter thick, the relatively minor improvements in focusing the reflectors obtained by using this type of additional aluminum plate may not be significant.

The inner surface of housing 6 and the outer surface of body 80 have circular curvatures centered abound central positioning point 90. The substrate facing surface of plate 88 will mate with the front surface of reflectors 12. In the disclosed embodiment, reflectors 12 are flat and two inches by two inches square. In this case, plate 88 will also have a substrate facing surface which is flat and two inches by two inches square. Plate 88, which is attached to heating element 86 and insulation 84, can swivel because of swivel 82, and is centered about and can pivot with respect to central positioning point 90.

As discussed above, plate 88 is perpendicular to a line between central positioning point 90 and the point in the center of pin 42, which acts as the terminus of the third leg of the isosceles triangle.

Referring once again to FIG. 3, one inclined surface 14 has been formed in substrate 16 by positioning head assembly 32 of fabrication tool 20 and one reflector 12 has been adhered to and positioned within this inclined surface. Positioning head assembly 28 of fabrication tool 20 is in the process of forming a second inclined surface 14 in substrate 16.

Figure 9:
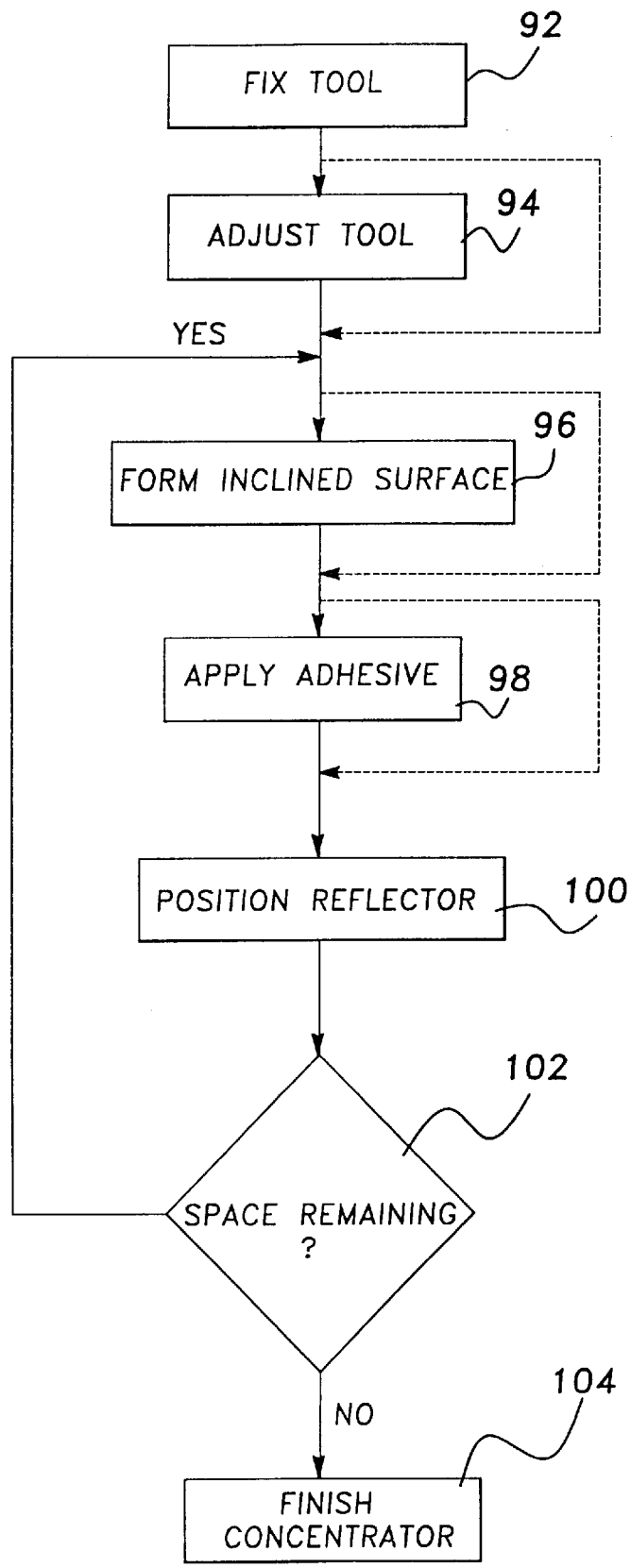
FIG. 9 is a block diagram of the process steps used to fabricate the inventive solar insolation concentrator.

The fabrication process for manufacturing solar insolation concentrator 10 is described in schematic format in FIG. 9. First substrate 16 is fixed with respect to fabrication tool 20, typically by placing substrate 16 over pivot 36. This is referred to as the fix tool 92 step. While pole 22 of fabrication tool 20 is shown in FIG. 3 as being centered within substrate 16, this is not required. Fabrication tool 20 will orient the center points of reflectors 12 with a common focal point, located in the center of pin 42, when light has an incidence angle parallel to pole 22, irrespective of the positioning and orientation of pole 22. Because reflectors 12 are flat and the sun is not a point light source, the solar energy will not be reflected to a single point, but will instead be directed toward a predetermined fixed area, in the center of which is the common focal point. The intended relative positions of solar insolation concentrator 10 and its associated solar receiver will determine the proper positioning and orientation of pole 22 with respect to substrate 16. As discussed above, the pivot 36 component of fabrication tool 20 is fixed with respect to substrate 16, and pole 22 is able to swivel around its central axis because of pivot 36.

Next, fabrication tool 20 is adjusted to provide the proper designed focal length. This step is referred to as the adjust tool 94 step. The designed focal length is the distance from the top surface of substrate 16 to the designed focal point in the center of swivel point shaft 68. Thin cable 62 is then adjusted to so that the distance between the designed focal point and the center of pin 42 is equal to the distance between the designed focal point and central positioning point 90. When fabrication tool 20 has been adjusted to manufacture a certain design of solar insolation concentrator 10, fabrication tool 20 does not need to be readjusted until the design of the desired solar insolation concentrator changes.

Next, fabrication tool 20 is used to form an inclined surface in substrate 16. This step is referred to as the form inclined surface 96 step. Positioning head assembly 32 is moved by the operator to the portion of substrate 16 that the next reflector 12 will be installed in. The orientation of plate 88 may need to rotationally adjusted (i.e. plate 88 may have to be rotated with respect to body 80 through use of swivel 82) to assure that reflectors 12 are positioned very close to each other, thereby providing the most compact configuration for solar concentrator 10. Electric heating element 86 is then energized, warming plate 88. Positioning head assembly 32 is then urged downward until plate 88 is entirely below the initial surface of substrate 16. Positioning head assembly 32 is then raised, leaving inclined surface 14 in substrate 16.

Adhesive is then applied to inclined surface 14 in the apply adhesive 98 step. A permanent spray adhesive which is able to withstand significant exposure to environmental elements, such as rain, heat and cold, is preferred.

In the position reflector 100 step, the back surface of reflector 12 is positioned adjacent to inclined surface 14 and plate 88 of positioning head assembly 32 is urged against the reflector, assuring that it has been property positioned. In the space remaining 102 step, the operator determines if sufficient space remains in substrate 16 to install another reflector 12. If the answer is yes, steps 96, 98, 100 and 102 are repeated.

If the answer is no, the operator takes any actions necessary to finish the fabrication of concentrator 10 in the finish concentrator 104 step. The finish concentrator 104 step may involve installing structural elements such as aluminum shell 18, filling a hole in substrate 16 left by swivel 36 and pole 22, placing a reflector 12 in the center of concentrator 10, etc. Because the hole in substrate 16 formed by swivel 36 and pole 22 is often quite small, it is often unnecessary to file this hole in the substrate and place a reflector 12 in the center of the concentrator 10. The concentrators 10 shown in FIGS. 1 and 2 have such a center reflector primarily for illustration purposes, but the installation of a reflector where the swivel 36 and pole 22 were located is not required.

As described above, substrate 16 could be sprayed with a thermoplastic adhesive, either before or after inclined surfaces have been formed in the substrate. Reflectors 12 could then be heated and pressed against and bonded to the adhesive coated substrate. It is possible to apply thermoplastic adhesive to the entire substrate and then simultaneously form inclined surfaces and position the reflectors using this method.

The form inclined surface step 96 and the position reflector step 100 can be performed simultaneously in a single step. For certain types of substrate 16 materials, the use of a separate adhesive will not be necessary. As heated reflector 12 is impressed within the body of substrate 16, for instance, the melting and crushing of the substrate material may sufficiently adhere the back surface of the reflector to the substrate without the use of a separate adhesive layer.

Solar insolation concentrators 10 could also be mass produced using a mold that contains an inverted image of a substrate already having all of the desired substrate inclined surfaces 14 preformed. Molding substrate 16 with preformed inclined surfaces 14 would allow the form inclined surface 96 step to be omitted from the fabrication process for concentrator 10. To assure that reflectors 12 are properly positioned, it is likely that fabrication tool 20 would need to be used to properly position reflectors 12 in the position reflector 100 steps, even if substrate 16 can be molded with extremely precise tolerances. Fabrication tool 20 would be an invaluable aid in developing a precise negative pattern for a substrate mold, should the expense of generating this type of tooling for one particular solar insolation concentrator design be justified. When the reflectors to be used are back-silvered types, the incorporation of an additional plate on the substrate facing surface of plate 88, as described above, will assure that the inclined surfaces 14 formed have ideal depths.

While solar insolation concentrator 10 was designed to efficiently collect solar energy (i.e. electromagnetic radiation having wavelengths between approximately 0.2 and 2.0 micrometers), the inventive concentrator will efficiently concentrate electromagnetic radiation having wavelengths outside of this range. For certain wavelengths of electromagnetic radiation, other materials (known to those of ordinary skill in the art) would provide better reflectance than back-silvered glass mirrors. It would also be possible to utilize solar insolation concentrator 10 as a reflector for transmission purposes. In this way, solar insolation concentrator 10 could act as a reflector for a dish antenna which is acting as a receptor or as a transmitter.

It is to be understood that the invention is not limited to the exact construction illustrated and described above, but that various changes and modifications may be made without departing from the spirit and scope of the invention as defined in the following claims.

I claim:

1. A fabrication tool for use in fabricating a solar insolation concentrator having a fixed focal point, a reflector support body and a plurality of reflectors, each of said reflectors having a face surface, a back surface and a center point, said fabrication tool comprising:

a support member, located in a fixed position with respect to said reflector support body, a guide rod, connected to and translatable with respect to said support member, a positioning head, connected to said guide rod, having a positioning face capable of receiving said face surfaces of said reflectors, and alignment means for automatically orienting said positioning face of said positioning head such that said face surfaces of said reflectors placed contiguous to said positioning face are aligned with respect to said fixed focal point.

2. A fabrication tool in accordance with claim 1 wherein said alignment means positions said positioning face of said positioning head based on said center points of said reflectors.

3. A fabrication tool in accordance with claim 1 wherein said positioning face is oriented perpendicularly to said guide rod.

4. A fabrication tool in accordance with claim 1 wherein said positioning face can swivel with respect to said guide rod.

5. A fabrication tool in accordance with claim 1 further including a second guide rod connected to said positioning head and connected to said support member.

6. A fabrication tool in accordance with claim 5 wherein both said guide rod and said second guide rod are fixed to said positioning head and the combination of said guide rod, said second guide rod and said positioning head pivot about a certain central positioning point.

7. A fabrication tool in accordance with claim 5 further including a guide, connected to said support member and pivoting about said fixed focal point, which constrains said second guide rod and allows said second guide rod to reciprocate with respect to said guide.

8. A fabrication tool in accordance with claim 1 wherein said alignment means consist exclusively of mechanical linkages.

9. A fabrication tool in accordance with claim 1 wherein said support member is a pole pivotally connected to said reflector support body.

10. A fabrication tool in accordance with claim 1 further including heating means for heating said positioning face of said positioning head.

11. A fabrication tool for use in fabricating a solar insolation concentrator having a fixed focal point, a reflector support body and a plurality of reflectors, each of said reflectors having a face surface, a back surface and a center point, said fabrication tool comprising:

a pole, located in a fixed position approximately normal to said reflector support body and capable of swivelling with respect to said reflector support body, a first swivel, connected to and capable of sliding along said pole, having an outer sleeve capable of swivelling with respect to said pole, an upper guide rod, passing through said outer sleeve, capable of freely sliding within said outer sleeve, biasing means for urging said first swivel away from said reflector support body, a second swivel, connected to said pole, having a lower sleeve capable of swivelling about said fixed focal point, a lower guide rod, passing through said lower sleeve, capable of freely sliding within said lower sleeve, a positioning head, connected to said upper guide rod and said lower guide rod, having a positioning face oriented normal to said upper guide rod, capable of receiving said face surfaces of said reflectors, and a cable connected to and coordinating the movement of said lower guide rod and said first swivel.

* * * * *